(12) United States Patent  (10) Patent No.: US 7,925,310 B2
Chiu  (45) Date of Patent: Apr. 12, 2011

(54) COMMUNICATION DEVICE WITH STICKUP STRUCTURE

(75) Inventor: Chi-Sheng Chiu, Shenkeng Township, Taipei County (TW)

(73) Assignee: Accton Technology Corporation, Hsinchu (TW)

( * ) Notice: Subject to any disclaimer, the term of this patent is extended or adjusted under 35 U.S.C. 154(b) by 643 days.

(21) Appl. No.: 11/806,939

(22) Filed: Jun. 5, 2007

(65) Prior Publication Data
US 2008/0304215 A1    Dec. 11, 2008

(51) Int. Cl.
*H04M 1/00*    (2006.01)

(52) U.S. Cl. .............. 455/575.1; 455/575.3; 455/575.4; 455/90.3; D14/138 R

(58) Field of Classification Search .... 455/575.1–575.9, 455/569.2, 90.3, 128, 312, 550.1, 344–350; 248/309.1–316.8; 312/7.1; 361/679.27–679.33; 345/158, 169, 156, 679–681
See application file for complete search history.

(56) References Cited

U.S. PATENT DOCUMENTS

| 7,019,964 | B1 * | 3/2006 | Maskatia et al. | 361/679.27 |
| 7,184,263 | B1 * | 2/2007 | Maskatia | 361/679.27 |
| 2008/0032637 | A1 * | 2/2008 | Ladouceur et al. | 455/90.3 |
| 2008/0081505 | A1 * | 4/2008 | Ou et al. | 439/374 |

* cited by examiner

*Primary Examiner* — Kent Chang
*Assistant Examiner* — San Htun
(74) *Attorney, Agent, or Firm* — WPAT, PC; Justin King

(57) ABSTRACT

The present invention provides a communication device comprising an upper panel having a display unit disposed thereon, and a lower panel having a plurality of keys disposed thereon; and a stickup structure having a first rail disposed on the lower surface of the upper panel and a second rail disposed on the lower panel, the first rail engaging to the second rail, wherein the upper panel is moveable along the second rail and could be stickup by the stickup structure.

4 Claims, 6 Drawing Sheets

COMMUNICATION DEVICE WITH STICKUP STRUCTURE

BACKGROUND OF THE INVENTION

1. Field of the Invention

This invention relates to a communication device, and more particularly to a communication device with Stickup Structure, thereby shrinking the device size, improving the practicability and convenience.

2. Description of the Prior Art

The market of electronic consumer products is widespread, continuously, various designs and multi-function devices can be chosen by the consumer for daily life. Due to the market trends, the performances and applications of the devices are developed and improved with rapid pace to fit the requirements. Therefore, the various communication devices come with the tide of fashion. Especially, the high-technology communication industries are progressive development with rapid pace. These popular communication devices include the cellular phones, the personal digital assistants (PDA) and the notebook.

In the markets of the electronics products, there are various types of the communication device, such as the cellular phones. For example, a bar cellular phone has a display unit and a plurality keys disposed on the same panel. However, in the bar cellular phone, the display unit size is always limited by the one of the key pad. When the dimension of the display unit is designed to occupy too much space within a limited area, there is no enough space for the key pad. On the converse, if the area of the key pad is larger than the one of the display unit, the display unit is too small to recognize. The clamshell cellular phone is the derivative of the bar cellular phones. The clamshell cellular phone has a display unit and a plurality of keys respectively disposed on different panels. Nevertheless, the size of the clamshell cellular phone is enlarged to receiving both panels, and may not be portable easily for the user. Therefore, the various slide cellular phones are developed to fit the different consumer's needs.

The conventional slide cellular phone provides larger display unit for users and the plurality of keys are received under the display unit. When the display unit disposed on the upper panel slides away from the lower panel, the keys disposed on the lower panel are exposed to allow the user to control the phone. The movement of the slide cellular phone is limited by the mechanical structure between the upper panel and the lower panel. No matter what kind of the above cellular phones is selected, the user usually holds and operates the cellular phones by one hand, or holds the cellular phones by one hand and operates by the other hand. Whatever, they are all very inconvenient and unpractical.

In view of the aforementioned, what is required is a brand new structure having sliding and stickup structure to overcome the above drawback, thereby satisfy the needs of the consumers with different ages and levels.

SUMMARY OF THE INVENTION

The present invention will descript some preferred embodiments. However, it is appreciated that the present invention can extensively perform in other embodiments except for these detailed descriptions. The scope of the present invention is not limited to these embodiments and should be accorded the following claims.

One objective of the present invention is to provide a communication device with sliding cover and stickup structure.

Another objective of the present invention is to provide a communication device, which can shrink the device size and improve the practicability and convenience.

Yet another objective of the present invention is to provide a communication device, wherein the upper panel includes a stickup mechanical structure for stickup the display unit when the upper panel is pressed by user.

The present invention provides a communication device comprising an upper panel having a display unit disposed thereon, and a lower panel having a plurality of keys disposed thereon; and a stickup structure having a first rail disposed on the lower surface of the upper panel and a second rail disposed on the lower panel, the first rail engaging to the second rail, wherein the upper panel is moveable along the second rail and could be stickup by the stickup structure.

The present invention provides a stickup structure, comprising a first rail; a rotatable base coupled to the first rail; and a second rail engaged to the first rail; wherein the rotatable base is moveable along the first rail to drive the connecting bar.

BRIEF DESCRIPTION OF THE DRAWINGS

The foregoing aspects and many of the attendant advantages of this invention will become more readily appreciated as the same becomes better understood by reference to the following detailed description, taken in conjunction with the accompanying drawings, wherein.

DESCRIPTION OF THE PREFERRED EMBODIMENT

In the following description, numerous specific details are provided in order to give a through understanding of embodiments of the invention. Referring now to the following description wherein the description is for the purpose of illustrating the preferred embodiments of the present invention only, and not for the purpose of limiting the same. One skilled in the relevant art will recognize, however, that the invention may be practiced without one or more of the specific details, or with other methods, components, materials, etc.

Figure 1:
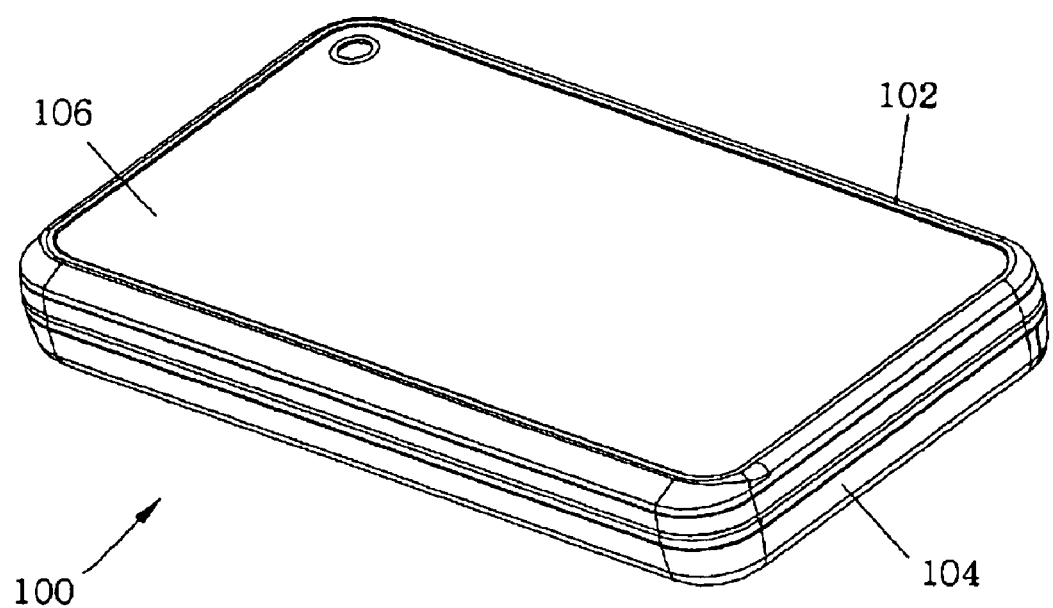
FIG. 1 illustrates a top view diagram of a communication device according to the present invention.
Figure 2:
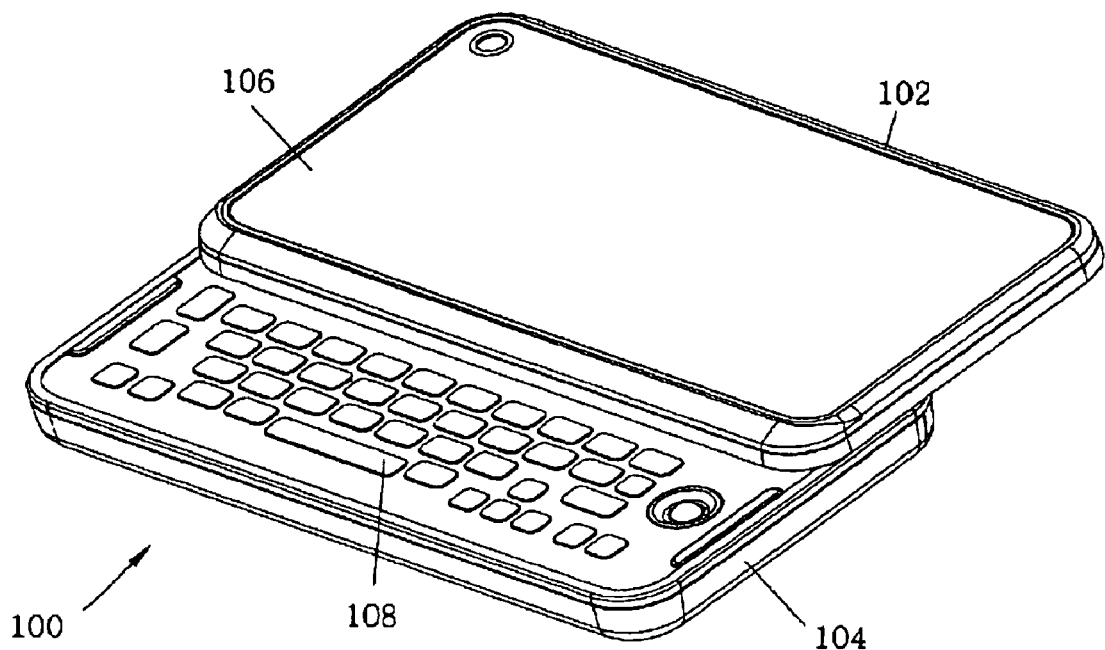
FIG. 2 illustrates a top view diagram of a communication device according to the present invention.
Figure 3:
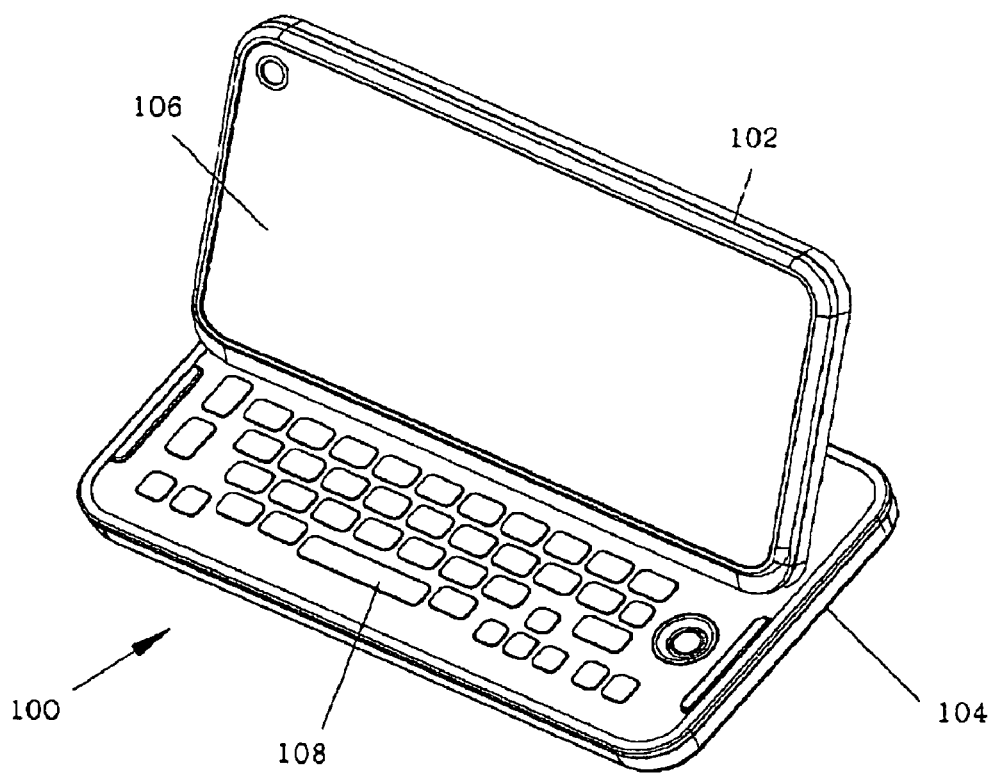
FIG. 3 illustrates a three-dimensional diagram of a communication device according to the present invention.

According to an aspect of the present invention, the present invention provides a communication device 100 with sliding and stickup structure, as shown in FIG. 1-3.

FIG. 1 illustrates a top view diagram of a communication device 100 according to the present invention. The communication device 100 comprises an upper panel 102 and a lower panel 104. The upper panel 102 has a display unit 106 disposed on the upper surface of the upper panel 102. As well known in the art, the display unit 106 is employed to display various information for operating and controlling the communication device 100. The display unit 106 may also display function menus to allow the user input instruction or display the video, pictures or an image data.

Figure 4:
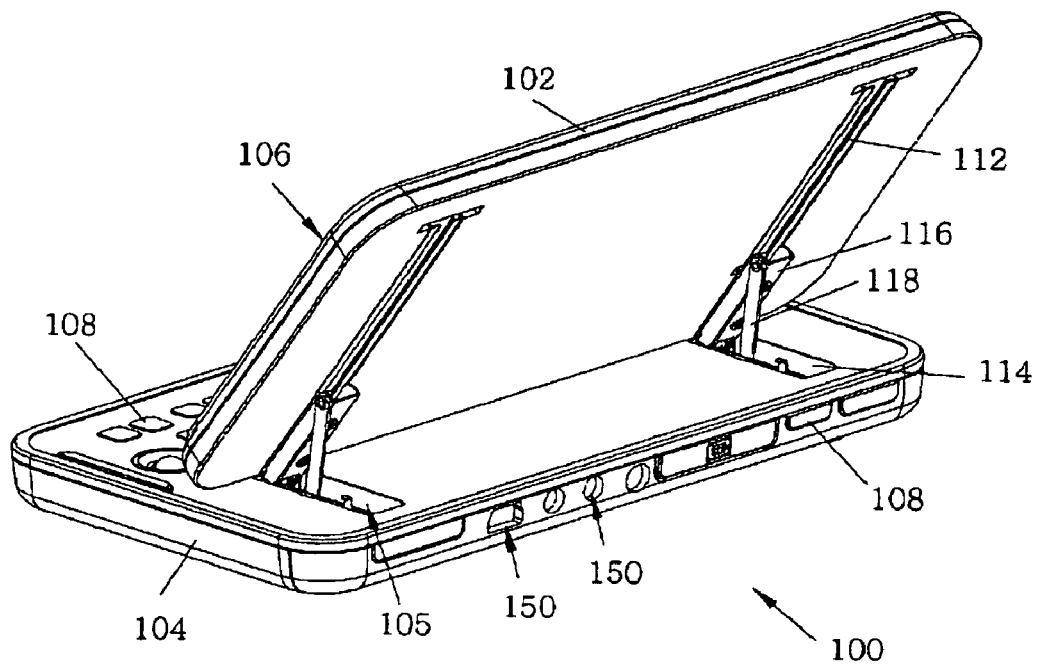
FIG. 4 illustrates a three-dimensional diagram of a communication device according to the present invention.

The lower panel 104 has a plurality of keys 108 disposed on the upper surface of the lower panel 104, as shown in FIG. 2. Alternatively, the keys 108 may be disposed on the peripheral side of the lower panel 104, as shown in FIG. 4. When the communication device 100 is standby, the lower panel 104 is received under the upper panel 102, and the keys 108 are invisible. When the communication device 100 is under operation, the upper panel 102 is pushed forwardly, the upper panel 102 is moveable along tracks on the lower panel 104 horizontally, and the keys 108 are exposed for operation. As well known in the art, the keys 108 includes the function of not only play, forward, reverse, data entry, but also various keys to fit the requirements of different demand.

FIG. 3 illustrates a three-dimensional diagram of the communication device 100 according to the present invention. When the upper panel 102 is pushed out, followed by pressing the upper cover 102, the upper panel 102 can be stickup on the lower panel 104 with an angle. Under such configuration, the communication device 100 could be placed on a planar platform, such as a table for operation. The display unit 106 is stickup in front of the keys 108, and therefore, the communication device 100 acts as a minimized notebook type device for the consumer or user.

Referring to FIG. 4, it illustrates a three-dimensional diagram of the communication device 100 according to the present invention. The communication device 100 further comprises a stickup structure 110 coupled between the upper panel 102 and the lower panel 104, to allow upper panel 102 is movable between the upper panel 102 and the lower panel 104 and the position of the upper panel 102 could be adjusted by the consumer. The lower panel 104 has a pre-formed through hole 105 formed thereon, and the stickup structure 110 can be received within the through hole 105. It is noted that the stickup structure 110 is invisible when the communication device 100 is at the stage of standby.

In FIG. 4, the stickup structure 110 comprises the first rails (or tracks) 112 disposed behind the upper panel 102 and embodied on the lower surface of the upper panel 102, and the second rails (or tracks) 114 disposed within the through hole 105 of the lower panel 104 and embodied on the upper surface of the lower panel 104. The physical structures of the first rails 112 and the second rails 114 are match with each other. It is noted that one or dual pairs of the combination of the first rails 112 and the second rails 114 could be selected to meet different requirements.

The stickup structure 110 further comprises a rotatable base 116 disposed on and coupled to the first rail 112, and a connecting bar 118 is engaged to the rotatable base 116 for supporting and fixing the upper panel 102. The upper panel 102 could be stickup on the lower panel 104 by the support of the stickup structure 110. The operation of the communication device 100 is described as follow.

In one embodiment, the communication device 100 further comprises a plurality of external device connector 150 disposed on the peripheral side of the lower panel 104. For instance, the external device connector 150 include, but not limited to, an AV jack, an earphone jack, a transmission port, a network port or a memory card connector.

Figure 5:
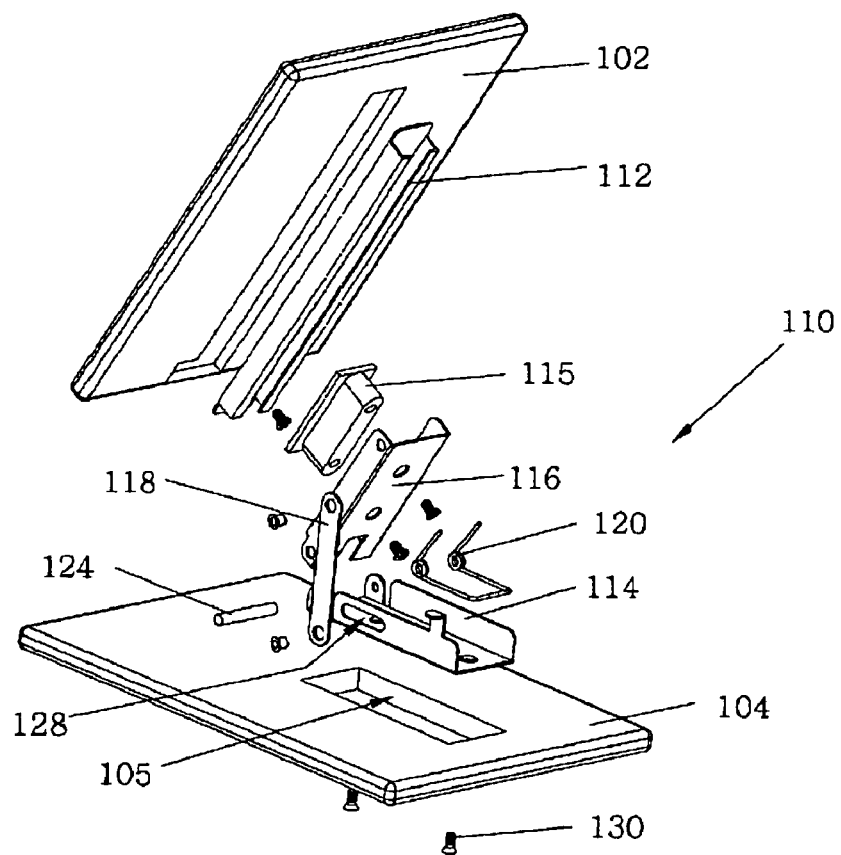
FIG. 5 illustrates a separated diagram of the communication device according to the present invention.

FIG. 5 illustrates a separated diagram of the stickup structure 110 according to the present invention. The first rail 112 is disposed behind the upper panel 102, and fixed on the upper panel 102 by the screws 130. A sliding block 115 is coupled and match with the first rail 112. The sliding block 115 could move along the first rail 112 back and forth. A rotatable base 116 is connected to the sliding block 115 by the screws 130, therefore, the rotatable base 116 is movable along the first rail 112 when the sliding block 115 is moved.

Further, the lower panel 104 has a pre-formed through hole 105 for receiving the stickup structure 110 when the communication device 100 is standby, accordingly. The second rail 114 is disposed within the through hole 105 and it is fixed on the lower panel 104. One end of the second rail 114 is engaged to the end of the rotatable base 116 by a spring 120 through a roller 124. The spring 120 may provide the supporting force to lift the panel. If the communication device 100 is under operation, the upper panel 102 could be pushed horizontally and pressed the panel to release the stickup structure 110, therefore, the upper panel 102 could be stickup on the lower panel 104 by the stickup structure 110. In one embodiment, the connecting bar 118 may adjust the stickup angle of the upper panel 102, and the connecting bar 118 could be move along a slot 128 formed on the side of the rotatable base 116. Due to the connecting bar 118 may rotated along one end of the second rail 114, pivotally so as to determine the stickup angle. The stickup angle between the sliding block 115 and the rotatable base 116 is adjustable by the friction therebetween.

In one embodiment, the roller 124 is used to fix the connection among the rotatable base 116, the second rail 114 and the spring 120. The roller 124 also can be replaced with various fixers that could provide the support and fixation. In one embodiment, the sliding block 115, the rotatable base 116, the second rail 114 and the connecting bar 118 are fixed by the plurality of screws 130. It is noted that the screws 130 could be replaced with various fixers as well according to the requirements.

In one embodiment, the slot 128 may also be formed on the side of the second rail 114 according to the requirements.

Figure 6:
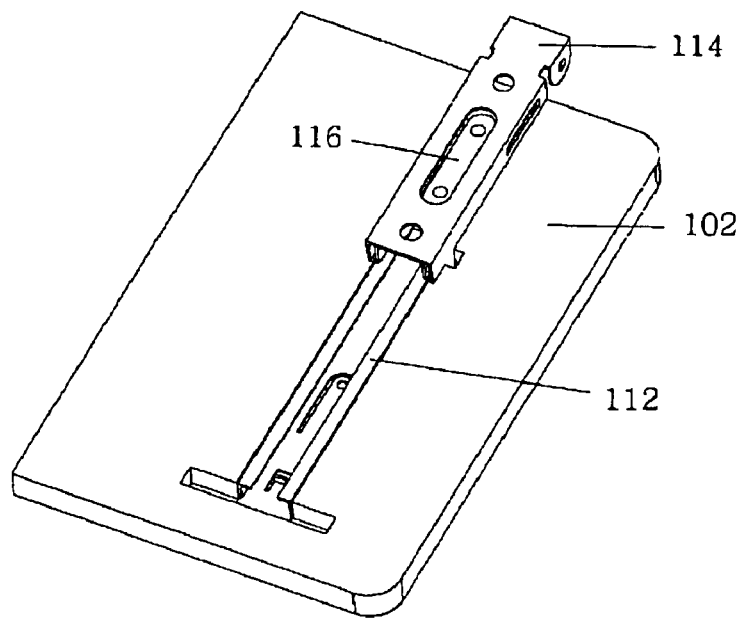
FIG. 6 illustrates a bottom view diagram of the upper panel disposed on the communication device according to the present invention.

FIG. 6 illustrates a bottom view diagram of the upper panel 102 disposed on the communication device 100 according to the present invention. The first rail 112 is configured on the lower surface of the upper panel 112, and both end of the first rail 112 is projecting inwardly and the center is hollow for holding the block 115 to allow the rotatable base 116 on the sliding block 115 moving and sliding along the first rail 112 horizontally. Then, the rotatable base 116 is coupled to the sliding block 115.

Figure 7:
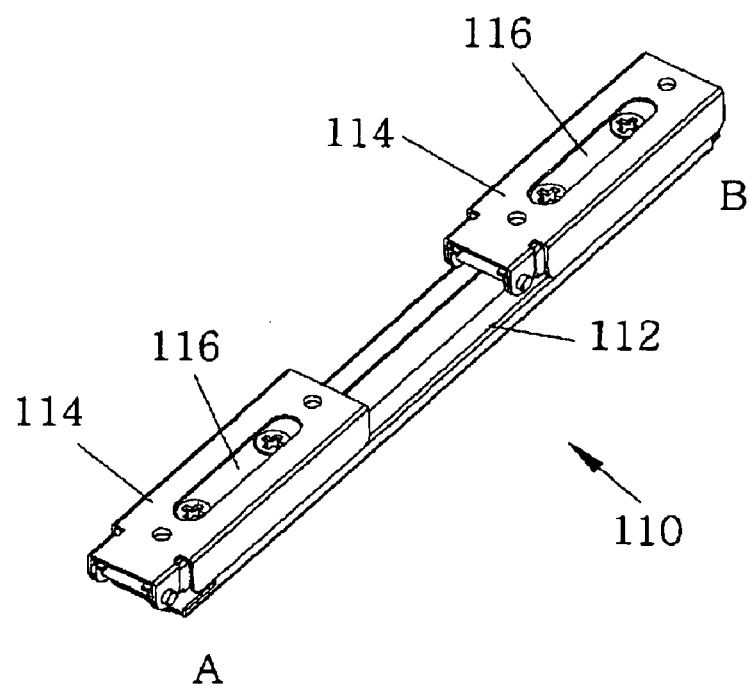
FIGS. 7 and 8 illustrate diagrams of the stickup structure of the communication device according to the present invention.
Figure 8:
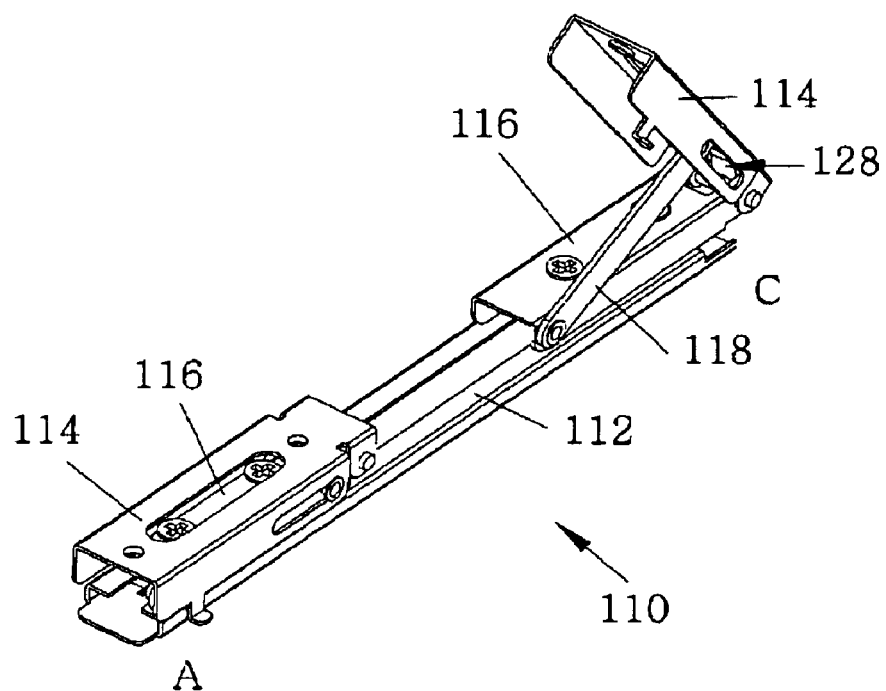

FIGS. 7 and 8 show diagrams of the stickup structure 110 of the communication device 100 according to the present invention. In FIG. 7, when the communication device 100 is standby, the sliding block 115 and the rotatable base 116 of the stickup structure 110 are hold and received at the origin position, as shown in "A" position. The sliding block 115 and the rotatable base 116 could be moved and slide to the first position, as shown in "B" position, when the communication device 100 is under operation. The first position ranges from the original position to the end of first rail 112. In FIG. 8, the second rail 114 is separated from the rotatable base 116 hold on the lower panel 104 when the stickup structure 110 moves to the second position, as shown in "C" position. The C position is indicated as the most lateral end of the first rail 112. Further, the sliding block 115 and the rotatable base 116 have the slot 128 respectively formed on the sidewalls thereon for coupling the connecting bar 118 and supporting the rotatable base 116 disposed on the upper panel 102. Accordingly, the upper panel 102 could be supported and stickup on the lower panel 104.

Figure 9:
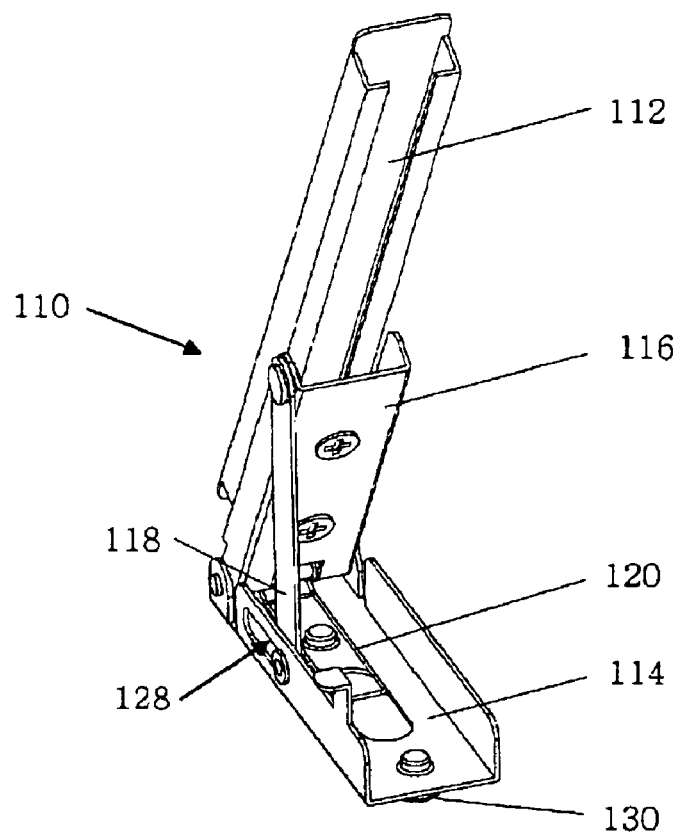
FIG. 9 illustrates a back view diagram of the combined stickup structure of the communication device according to the present invention.

FIG. 9 illustrates a back view diagram of the combined moveable structure 110 of the communication device 100 according to the present invention. The spring 120 is disposed to couple the sliding block 115 and the rotatable base 116, and the spring 120 is designed as both ends is projecting outwardly and the center has several coiled circles. One end of the spring 120 is coupled to the sliding block 115 and other end of the spring 120 is coupled to the second rail 114. The movement between the rotatable base 116 and the second rail 114 is adjustable by the friction there-between. The spring 120 is under pressure when the communication device 100 is standby, and the spring 120 is released after the pressure is moved.

Figure 10:
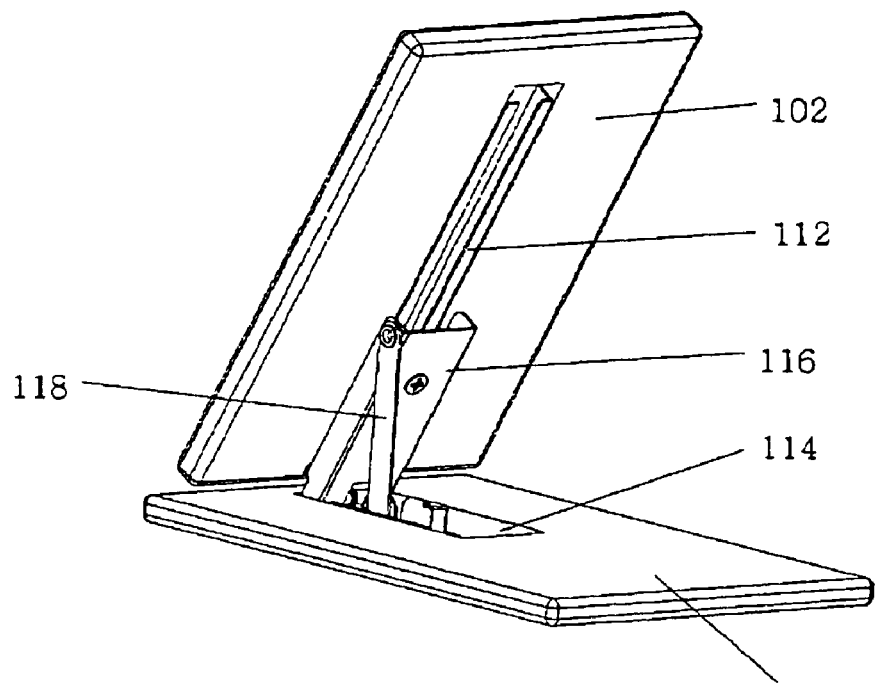
FIG. 10 illustrates a back view diagram of the communication device according to the present invention.

FIG. 10 illustrates a back view diagram according to the present invention. The connecting bar 118 is pushed slightly and downwardly to guide the rotatable base 116 to cover the sliding block 115 for coupling to the first rail 112. Then, the rotatable base 116 and the sliding block 115 will be moved to the second position, B, and cover the lower panel 104. The rotatable base 116 and the sliding block 115 slide to the origin position, A, and the stickup structure 110 is received between the upper panel 102 and the lower panel 104.

Figure 11:
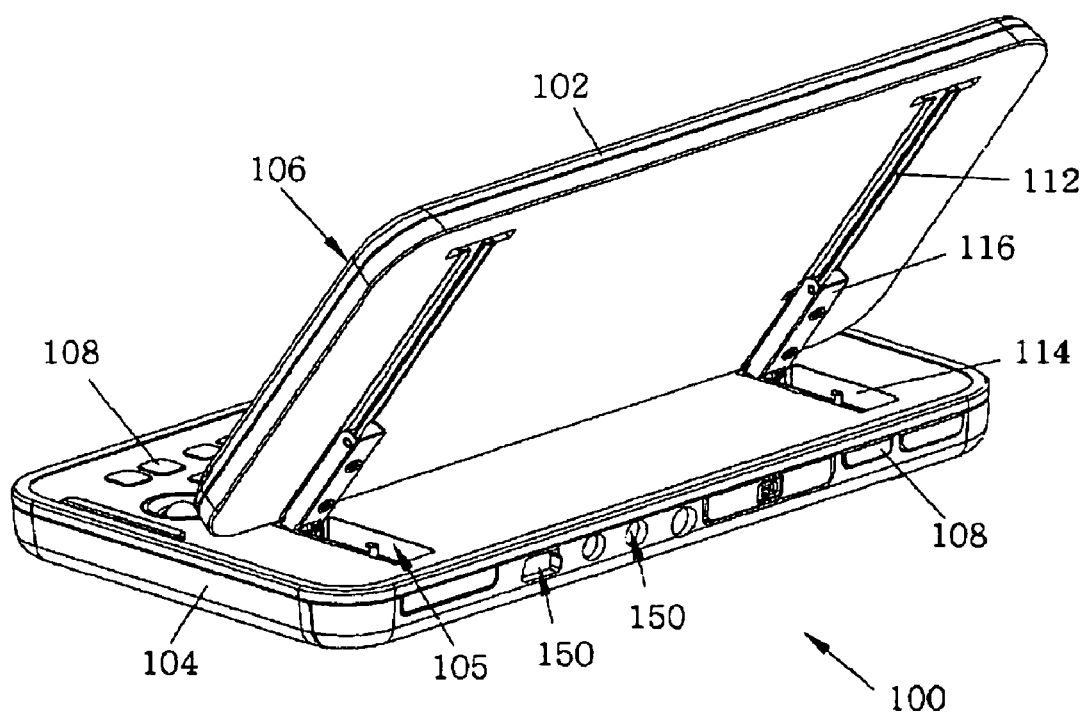
FIG. 11 illustrates a back view diagram of the communication device according to the present invention.

According to one aspect of the present invention, the connecting bar 118 is optional to dispose on the communication device 100. FIG. 11 illustrates a back view diagram of the communication device 100 according to the present invention. In FIG. 11, the user can press slightly on the upper panel 102 to force the stickup structure 110 down, followed by placing the upper panel 102 on the lower panel 104. Consequently, the stickup structure 110 could be received within the through hole 105 by the user.

In the specification, it is appreciated that the certain descriptions regarding the similar elements are omitted to avoid obscuring the present invention. It is noted that the element and the arrangement of the device are illustrated to describe but not to limit the present invention. The element and the arrangement of the device can be modified according to the requirements of different conductions.

According to the aspect of the present invention, the present invention provides a communication device with sliding and stickup structure. Further, the present invention provides good solutions for size reduction and reduces the costs.

Moreover, the user can slide the upper panel to stickup the lower panel for operation. It should be noted that the present invention may apply to various communication industries and also can be applied and modified to other related applications.

As will be understood by a person skilled in the art, the foregoing preferred embodiments of the present invention are illustrative of the present invention, rather than limiting the present invention. Having described the invention in connection with a preferred embodiment, modification will suggest itself to those skilled in the art. Thus, the invention is not to be limited by this embodiment. Rather, the invention is intended to cover various modifications and similar arrangements included within the spirit and scope of the appended claims, the scope of which should be accorded the broadest interpretation so as to encompass all such modifications and similar structures.

What is claimed is:

1. A communication device, comprising:
   an upper panel having a display unit disposed thereon, and
      a lower panel having a plurality of keys disposed thereon; and
   a stickup structure, comprising:
      a first rail disposed on the lower surface of said upper panel and a second rail fixed on said lower panel, said first rail engaging to said second rail;
      a slot disposed on a side of said second rail;
      a sliding block, slidably connected to said first rail;
      a rotatable base, rigidly connected to said sliding block and pivotally connected to the second rail; and
      a connecting bar, disposed at a lateral side of said rotatable base and said second rail, wherein one end of said connecting bar is pivotally engaged to said rotatable base and the other end of said connecting bar is pivotally and slidably coupled to said slot determining the stickup angle of the upper panel;
      wherein said upper panel is moveable along said second rail and is capable of being supported on said lower panel when said stickup structure is extended.

2. The device in claim 1, wherein said sliding block is disposed between said rotatable base and said first rail.

3. The device in claim 1, wherein said rotatable base is engaged to said second rail by a spring.

4. The device in claim 1, wherein said rotatable base is engaged to said second rail by a roller.

* * * * *